United States Patent
Gao et al.

(10) Patent No.: US 7,486,724 B2
(45) Date of Patent: Feb. 3, 2009

(54) CODEC COMPENSATION TECHNIQUES FOR CHANNEL ANALYSIS APPLICATIONS

(75) Inventors: Xiao M. Gao, Raleigh, NC (US); Wesley H. Smith, Raleigh, NC (US)

(73) Assignee: Intel Corporation, Santa Clara, CA (US)

(*) Notice: Subject to any disclaimer, the term of this patent is extended or adjusted under 35 U.S.C. 154(b) by 812 days.

(21) Appl. No.: 10/651,425

(22) Filed: Aug. 29, 2003

(65) Prior Publication Data

US 2005/0047498 A1    Mar. 3, 2005

(51) Int. Cl.
  *H04B 3/46* (2006.01)
  *H04B 17/00* (2006.01)
  *H04Q 1/20* (2006.01)

(52) U.S. Cl. .................. 375/224; 375/227; 375/228; 375/346; 375/350

(58) Field of Classification Search ......... 375/224–227, 375/295
See application file for complete search history.

(56) References Cited

U.S. PATENT DOCUMENTS

| | | | |
|---|---|---|---|
| 4,009,356 A | | 2/1977 | Borysiewicz et al. |
| 4,682,118 A * | | 7/1987 | Thiel ..................... 329/346 |
| 5,724,006 A * | | 3/1998 | Kilian et al. ............ 330/294 |
| 6,236,714 B1 * | | 5/2001 | Zheng et al. ........... 379/1.03 |
| 6,532,215 B1 | | 3/2003 | Muntz |
| 6,801,601 B2 | | 10/2004 | Kamali et al. |
| 6,876,725 B2 | | 4/2005 | Rashid-Farrokhi |
| 6,891,803 B1 | | 5/2005 | Chang et al. |
| 6,917,595 B2 | | 7/2005 | Chang et al. |
| 2001/0053205 A1 | | 12/2001 | Kikui |
| 2002/0131568 A1 | | 9/2002 | Chea, Jr. et al. |
| 2002/0172329 A1 * | | 11/2002 | Rashid-Farrokhi et al. .................. 379/22.02 |
| 2004/0203472 A1 * | | 10/2004 | Chien ........................ 455/68 |
| 2004/0247024 A1 * | | 12/2004 | Gao et al. ................. 375/222 |

FOREIGN PATENT DOCUMENTS

WO  WO 01/95598  A2  12/2001
WO  WO 03/026160  A2  3/2003

OTHER PUBLICATIONS

International Telecommunication Union, "High bit rate digital subscriber line (HDSL) transceivers", ITU-T Recommendation G.991.1, Oct. 1998, 169 pages.

International Telecommunication Union, "Asymmetric digital subscriber line (ADSL) transceivers", ITU-T Recommendation G.992.1, Jun. 1999, 255 pages.

International Telecommunication Union, "Single-pair high-speed digital subscriber line (SHDSL) transceivers—For approval—Updated", ITU-T Recommendation G.991.1, Feb. 2001, 183 pages.

(Continued)

*Primary Examiner*—Curtis B Odom
(74) *Attorney, Agent, or Firm*—Caven & Aghevli LLC

(57) ABSTRACT

Methods and apparatus to perform and/or analyze communication channels are described. In one embodiment, a test signal may be generated and transferred using a first signal route to a line-under-test in response to line qualification mode. The first signal route may include a compensation device to modify the test signal. In some embodiments, a reflected signal from the line-under-test may be received in response to the test signal. A second signal route may be utilized to route the reflected signal in response to line qualification mode.

26 Claims, 3 Drawing Sheets

OTHER PUBLICATIONS

Gao, Xiao M. et al., U.S. Appl. No. 10/457,092, filed Jun. 6, 2003, "Techniques to Perform Line Qualification", 19 pages including figures.

European Patent Office, International Search Report/Written Opinion re: International Application No. PCT/US2004/016583, 12 pages, Sep. 22, 2004.

* cited by examiner

CODEC COMPENSATION TECHNIQUES FOR CHANNEL ANALYSIS APPLICATIONS

CROSS REFERENCE TO RELATED PATENT APPLICATION

The present application is related to U.S. patent application Ser. No. 10/457,092, filed Jun. 6, 2003.

FIELD

The subject matter disclosed herein generally relates to techniques to test signal propagation media.

DESCRIPTION OF RELATED ART

Line qualification can determine whether a signal propagation medium is capable of providing communications in accordance with a particular communications standard. For example, line qualification can be performed to determine whether a signal propagation medium can be used with DSL standards and variations thereof (including but not limited to ADSL, SHDSL, and VDSL) (DSL standards and variations thereof hereafter are referred to as xDSL). For a description of xDSL standards, see, for example, ITU-T G.991.1, High bit rate Digital Subscriber Line T transceivers (1998); ITU-T G.991.2, Single-pair high-speed Digital Subscriber Line transceivers (2001); ITU-T G.992.1 ADSL standard G.dmt (1999); and related standards. Current DSL and ADSL line qualification techniques typically use dedicated and very expensive hardware and can involve an expensive procedure of dispatching of a trained technician to the client modem site. Currently, it is impractical to build line qualification systems inside cost-sensitive DSL and ADSL mass production modems.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanying drawings in which:

Note that use of the same reference numbers in different figures indicates the same or like elements.

DETAILED DESCRIPTION

Figure 1:
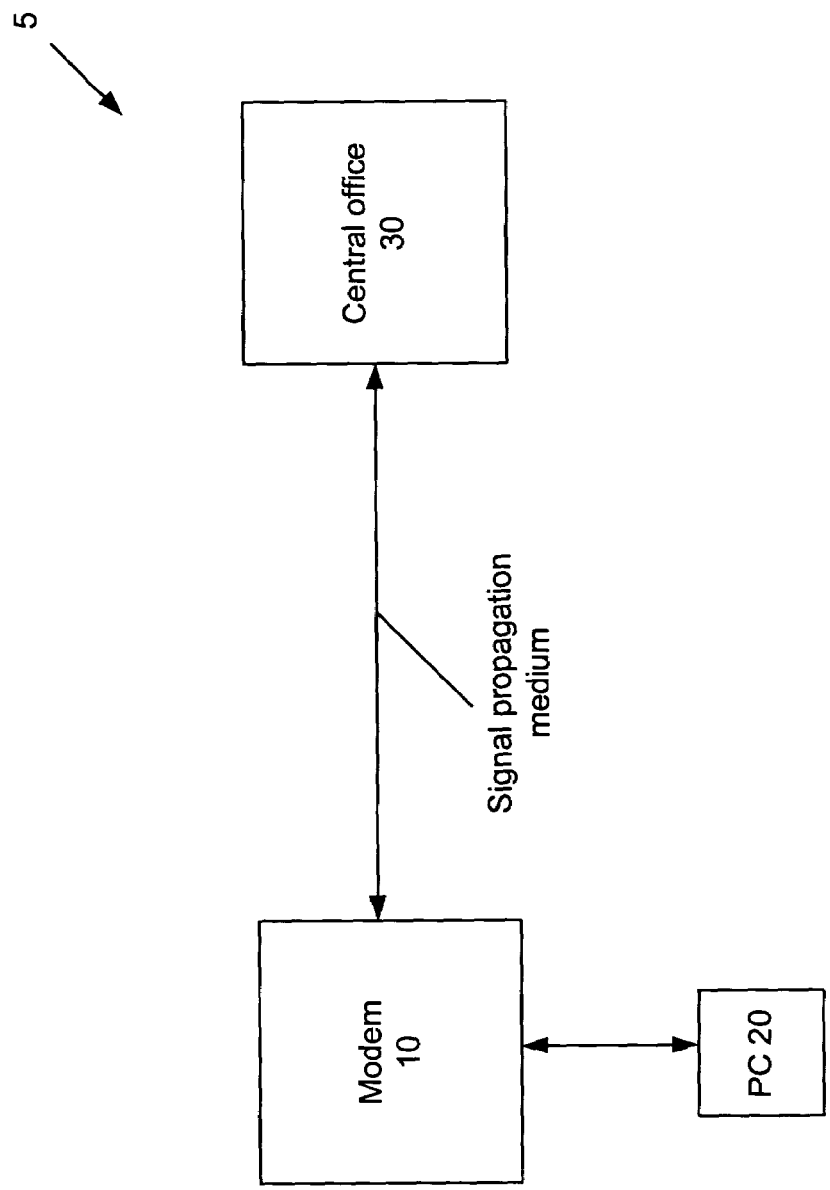
FIG. 1 depicts in block diagram format a communications system in accordance with an embodiment of the present invention.

FIG. 1 depicts in block diagram format a communications system 5. Modem 10 may provide communications between a personal computer (PC) 20 and a central office modem 30 using a communications medium such as a twisted pair telephone line. Modem 10 may provide communications capabilities in accordance, for example, with xDSL and/or other protocols.

Modem 10 may communicate with PC 20 using a cable or bus compliant, for example, with Peripheral Component Interconnect (PCI), Universal Serial Bus (USB), Ethernet (e.g., IEEE 802.3), and/or IEEE 1394, although other techniques may be used such as wireless techniques described, for example, in IEEE 802.11 (and related standards).

In accordance with an embodiment of the present invention, a modem may perform line qualification of a line, such as one or a combination of a twisted pair telephone line, coaxial cable, or other signal propagation medium, to determine whether the line is capable of providing xDSL or other communications services. The modem may at least perform line qualification of lines of different lengths and having one or more bridge taps. For example, a bridge tap may represent a juncture in which another modem or device may access the line. To perform line qualification, the modem may transmit test signals to the line and process signals reflected by the line in response to the test signals.

Figure 2:
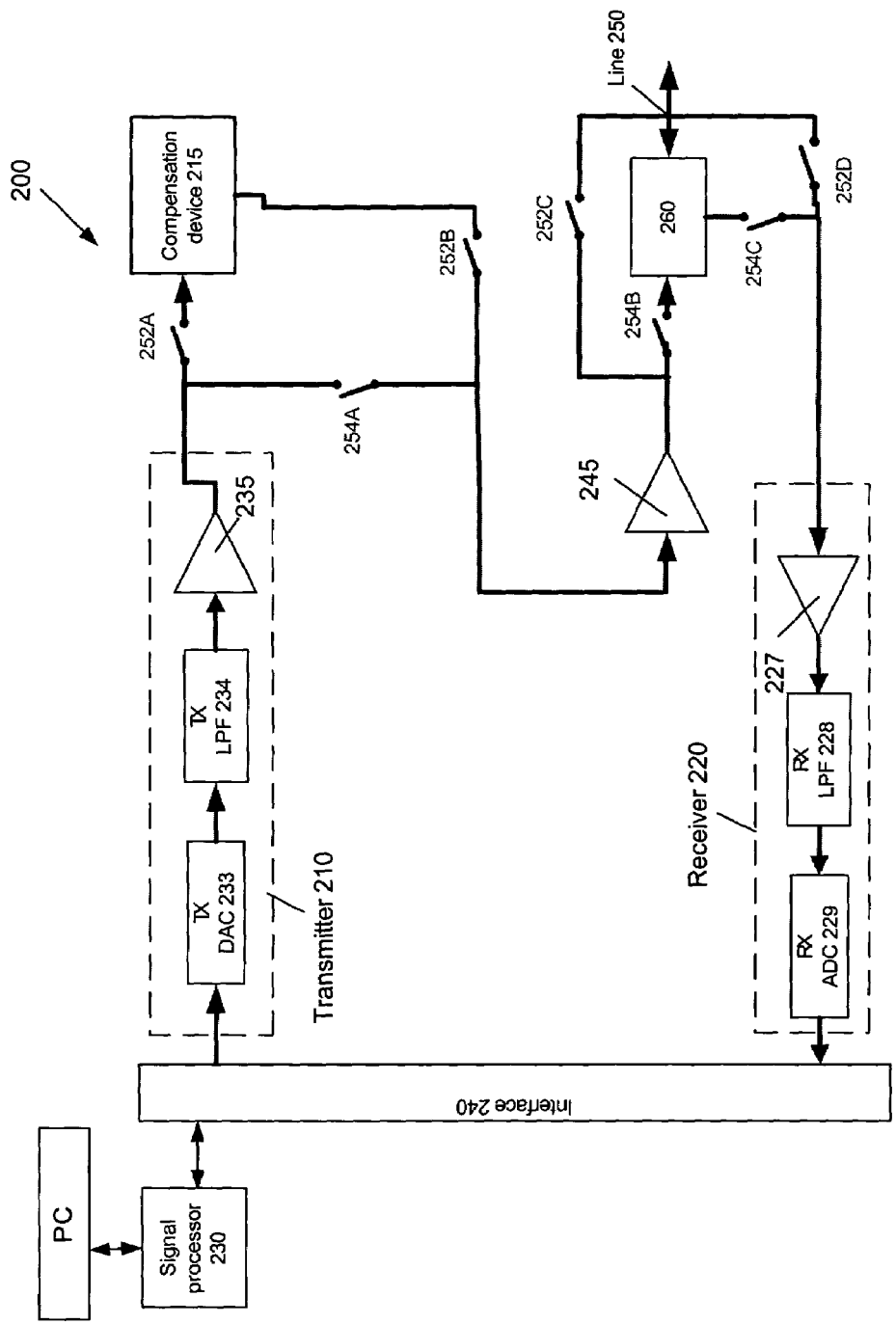
FIG. 2 depicts one possible implementation of a modem in accordance with an embodiment of the present invention.

FIG. 2 depicts one possible implementation of a modem 200 in accordance with an embodiment of the present invention, although other implementations may be used. One embodiment of modem 200 may include signal processor 230, interface 240, transmitter 210, compensation device 215, receiver 220, line driver 245, hybrid 260, and switches 252A-252D and 254A-254C, although other implementations may be used. Modem 200 may be implemented as any or a combination of: hardwired logic, software stored by a memory device and executed by a microprocessor, firmware, an application specific integrated circuit (ASIC), and/or a field programmable gate array (FPGA). In one implementation, one advantage, although not a necessary feature, is that line qualification capabilities may be manufactured using cost-effective analog front end devices.

Modem 200 may communicate with a far end modem or other device using line 250. Modem 200 may operate in line qualification mode and modem mode. In line qualification mode, modem 200 may operate in "transmit" and "receive" modes. In "transmit" and "receive" line qualification modes, switches 252A-252D may be set to close (i.e., transfer signals) and switches 254A-254C may be set to open (i.e., to not transfer signals). During "transmit" line qualification mode, test signals transmitted by signal processor 230 to line 250 may traverse interface 240, transmitter 210, closed switch 252A, compensation device 215, closed switch 252B, line driver 245, and closed switch 252C. Such test signals may bypass hybrid 260 and may avoid introducing board echo attributable to the hybrid 260.

In "receive" line qualification mode, a reflection signal from line 250 based on a test signal transmitted in "transmit" line qualification mode may be transferred by closed switch 252D to amplifier 227. Accordingly, modem 200 may route reflection signals during "receive" line qualification mode to bypass the hybrid 260 to avoid introducing board echo attributable to the hybrid 260.

In one implementation, if line qualification passes, then modem 200 may operate in normal modem mode. When the modem 200 operates in modem mode, switches 254A-254C may be set to close (i.e., transfer signals) and switches 252A-252D may be set to open (i.e., not transfer signals). To transmit signals in modem mode, transmitter 210 may transmit signals to line 250 through closed switch 254A, line driver 245, closed switch 254B, and hybrid 260. To receive signals in modem mode, amplifier 227 of receiver 220 may receive signals from line 250 through hybrid 260 and closed switch 254C. Additional description of receiving signals during modem mode is provided with respect to description of receiver 220. In one implementation, a controller (such as signal processor 230) may control the open/close states of switches 252A-252D and 254A-254C during line qualification and modem modes.

Signal processor 230 may perform modulation/demodulation, encoding/decoding of signals in accordance with xDSL. For example, signal processor 230 may operate in compliance with xDSL standards such as ITU-T G.991.1, ITU-T G.991.2, and ITU-T G.992.1. Signal processor 230 may determine and indicate whether line 250 passes or fails line qualification for xDSL or another service. For example, signal processor 230 may control the amplitude and duration of test signal pulses. Based on signals reflected by the line 250 in response to the test signals, signal processor 230 may modify the duration and/or amplitude of the test signals. Based on signals reflected by line 250 in response to test signals, signal processor 230 may determine characteristics of the line (such as the length of the line, whether a bridge tap exists in the line, and cross talk noise level) and/or whether the line passes line qualification for xDSL or other services.

For example, signal processor 230 may use time domain reflectometry (TDR) techniques to determine the length of line 250. The length of the line may be an important factor in whether the line passes line qualification for xDSL service although other factors may be considered such as the existence and distance of any bridge taps in the line and cross talk noise level. Signal processor 230 may be implemented as any or a combination of: hardwired logic, software stored by a memory device and executed by a microprocessor (for example, software executed for example by PC 20 or a central processing unit of modem 200 (not depicted)), firmware, an application specific integrated circuit (ASIC), and/or a field programmable gate array (FPGA).

Figure 3:
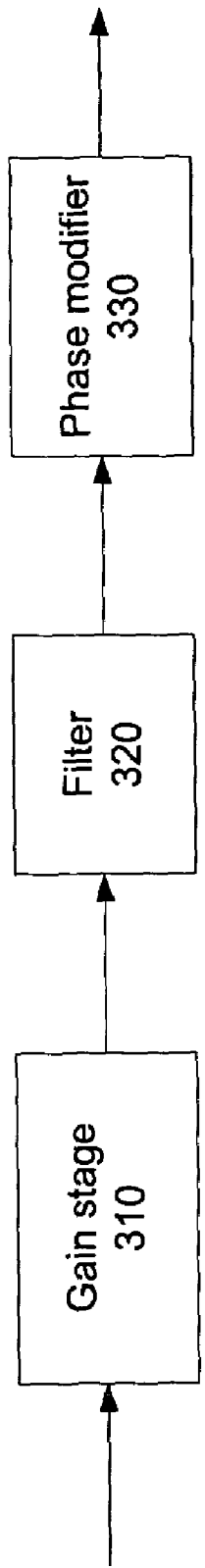
FIG. 3 depicts an example of a compensation device in accordance with an embodiment of the present invention.

Compensation device 215 may reduce distortions in test signals provided through transmitter 210. In one implementation, compensation device 215 may provide a gain boost, high-pass filtering, and phase modification of test signals. FIG. 3 depicts one possible implementation of compensation device 215, in accordance with an embodiment of the present invention. Compensation device 215 may include gain stage 310, filter 320, and phase modifier 330. Gain stage 310 may provide a power gain boost of the test signal of approximately 50 dB. Filter 320 may high-pass filter the gain boosted test signal from gain stage 310. For example, filter 320 may transfer the gain boosted test signal for frequencies above approximately 138 kHz. Phase modifier 330 may provide a one-hundred-eighty (180) degree phase shift of the signal transferred from filter 320.

In order to estimate the length of line 250, the attenuated amplitude of the reflected signal must be reliably detected so that the time interval between the test signal and peak of the reflected signal can be accurately calculated. In some implementations, low-pass filtering of the test signal (e.g., by LPF 234) may spread the width of the test signal and generate ripples in the test signal that could bury the reflected signal thereby making TDR measurement impossible. Compensation device 215 may reduce the stop band signal attenuation caused by low-pass filtering. The time interval between the compensated test signal and loop echo may then be accurately calculated to accurately determine the length of the line 250 or other characteristics of the line 250.

Interface 240 may transfer signals to transmitter 210 and/or receive signals from receiver 220. For example, interface 240 may transfer signals to and from a signal processor 230. Interface 240 may transfer signals to and from a personal computer (PC) (not depicted).

Transmitter 210 may process signals for transmission to a far end modem or central office in compliance, for example, with xDSL standards, although other standards may be complied with. One implementation of transmitter 210 may include digital-to-analog converter (DAC) 233, low pass filter (LPF) 234, and line driver 235, although other implementations can be used. DAC 233 may receive signals from interface 240. DAC 233 may be implemented as a conventional digital-to-analog converter. LPF 234 may receive signals from DAC 233. LPF 234 may be implemented as a filter having a pass band from approximately DC to 138 kHz. Line driver 235 may receive signals from LPF 234. Line driver 235 may provide a voltage gain of approximately 15.7 dB. In one implementation, a controller (such as signal processor 230) may program the characteristics (e.g., gain, pass band, on/off state) of each of the components of transmitter 210.

Receiver 220 may process received signals in compliance, for example, with xDSL standards, although other standards may be complied with. Received signals may be transmitted by a far end modem or central office via a bridge tap or be a reflection of a transmitted test signal. One implementation of receiver 220 may include amplifier 227, low pass filter (LPF) 228, and receiver analog-to-digital converter (ADC) 229, although other implementations may be used.

During "receive" modem mode, amplifier 227 may receive signals from line 250 through hybrid 260 and closed switch 254C, but during "receive" line qualification mode, amplifier 227 may receive reflected signals from line 250 through switch 252D. Amplifier 227 may provide a voltage gain in the range of approximately 0 to 9 dB. LPF 228 may be implemented as a low pass filter having a pass band of approximately DC to approximately 552 or 1104 kHz. LPF 228 may provide signals to ADC 229. ADC 229 may convert signals from analog to digital formats. ADC 229 may provide digital format signals to interface 240.

MODIFICATIONS

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:
    a test signal generator to provide a test signal and selectively transfer the test signal using a first signal route to a line-under-test in response to line qualification mode, wherein the first signal route includes a compensation device to modify the test signal;
    a receiver to receive a reflected signal from the line-under-test, wherein the reflected signal comprises a signal reflected by the line-under-test in response to the test signal, wherein the receiver selectively uses a second signal route to route the reflected signal in response to line qualification mode; and
    a signal processor to modify one of a duration and amplitude of the test signal based on the reflected signal,
    wherein the first signal route comprises a route to bypass a hybrid line interface element and the second signal route comprises a route to bypass the hybrid line interface element, wherein the first signal route and second signal route are to bypass the hybrid line interface to reduce introduction of board echo attributable to the hybrid line interface.

2. The apparatus of claim 1, wherein the compensation device is to reduce distortions in the test signal.

3. The apparatus of claim 1, wherein the compensation device is to reduce width spreading and ripples in the test signal.

4. The apparatus of claim 1, wherein the compensation device is to provide gain boost, high-pass filtering, and one-hundred-eighty (180) degree phase shift of the test signal.

5. The apparatus of claim 1, wherein the receiver is to selectively receive a received signal from the line-under-test using a third signal route in response to modem mode, and the third signal route includes processing by the second signal route and the hybrid line interface element.

6. The apparatus of claim 1, wherein the test signal generator is to selectively control signal routes of the test signal and the reflected signal in response to line qualification mode.

7. The apparatus of claim 1, wherein the test signal generator is to selectively modify the energy of the test signal based, in part, on the reflected signal.

8. The apparatus of claim 1, wherein the test signal generator is to determine a length of the line-under-test based on the test signals and reflected signals.

9. The apparatus of claim 8, wherein the test signal generator is to determine whether the line-under-test passes line qualification, in part, on the length of the line-under-test.

10. The apparatus of claim 1, further comprising a fourth signal route to selectively transfer signals to the line-under-test in response to modem mode, wherein the fourth signal route includes processing by a component not processed within the first signal route.

11. The apparatus of claim 10, wherein the component not processed within the first signal route comprises a hybrid line interface element.

12. The apparatus of claim 1, wherein the test signal generator is to selectively control signal routes of a signal transmitted from the test signal generator and a received signal in response to modem mode.

13. A method comprising:
selectively transferring a test signal using a first signal route to a line-under-test in response to line qualification mode, wherein the using the first signal route comprises reducing at least one distortion of the test signal;
selectively transmitting signals to the line-under-test using a second signal route in response to modem mode, wherein the first signal route avoids processing of at least one component of the second signal route; and
modifying one of a duration and amplitude of the test signal based on the reflected signal,
wherein the first signal route comprises a route to bypass a hybrid line interface element and the second signal route comprises a route to bypass the hybrid line interface element, wherein the first signal route and second signal route are to bypass the hybrid line interface to reduce introduction of board echo attributable to the hybrid line interface.

14. The method of claim 13, further comprising:
receiving a reflected signal from the line-under-test, wherein the reflected signal comprises a signal reflected by the line-under-test in response to the test signal, wherein the receiving selectively uses a third signal route to route the reflected signal in response to line qualification mode; and
selectively receiving a received signal from the line-under-test using a fourth signal route in response to modem mode, wherein the fourth signal route includes the third signal route and at least avoided one component of the third signal route.

15. The method of claim 13, wherein the at least one component of the second signal route comprises a filter.

16. The method of claim 13, further comprising selectively modifying the energy of the test signal based, in part, on the reflected signal.

17. The method of claim 13, further comprising determining a length of the line-under-test based on the test signals and reflected signals.

18. The method of claim 17, further comprising determining whether the line-under-test passes line qualification based, in part, on the length of the line-under-test.

19. The method of claim 13, wherein the reducing at least one distortion of the test signal comprises reducing width spreading and ripples in the test signal.

20. The method of claim 13, wherein the reducing at least one distortion of the test signal comprises gain boosting, high-pass filtering, and one-hundred-eighty (180) degree phase shifting the test signal.

21. A system comprising:
a modem comprising:
a test signal generator to provide a test signal and selectively transfer the test signal using a first signal route to a line-under-test in response to line qualification mode, wherein the first signal route includes a compensation device to modify the test signal,
a receiver to receive a reflected signal from the line-under-test, wherein the reflected signal comprises a signal reflected by the line-under-test in response to the test signal, wherein the receiver selectively uses a second signal route to route the reflected signal in response to line qualification mode;
a signal processor to modify one of a duration and amplitude of the test signal based on the reflected signal; and
an interface device to exchange signals with the modem,
wherein the first signal route comprises a route to bypass a hybrid line interface element and the second signal route comprises a route to bypass the hybrid line interface element, wherein the first signal route and second signal route are to bypass the hybrid line interface to reduce introduction of board echo attributable to the hybrid line interface.

22. The system of claim 21, wherein the interface device is compatible with PCI.

23. The system of claim 21, wherein the interface device is compatible with PCI express.

24. The system of claim 21, wherein the interface device is compatible with Ethernet.

25. The system of claim 21, wherein the interface device is compatible with Universal Serial Bus.

26. The system of claim 21, wherein the compensation device is to reduce distortions in the test signal.

* * * * *